United States Patent
Keller et al.

(10) Patent No.: US 11,754,688 B2
(45) Date of Patent: *Sep. 12, 2023

(54) METHOD AND DEVICE FOR OPTIMIZING THE USE OF MULTIPLE EMITTERS AND A DETECTOR IN AN ACTIVE REMOTE SENSING APPLICATION

(71) Applicant: FASTREE3D SA, Ecublens (CH)

(72) Inventors: Stefan Keller, Le Mont-sur-Lausanne (CH); Bruno Penlae, Lausanne (CH)

(73) Assignee: FASTREE3D SA, Ecublens (CH)

( * ) Notice: Subject to any disclaimer, the term of this patent is extended or adjusted under 35 U.S.C. 154(b) by 1019 days.

This patent is subject to a terminal disclaimer.

(21) Appl. No.: 16/493,028

(22) PCT Filed: Mar. 16, 2017

(86) PCT No.: PCT/EP2017/056322
§ 371 (c)(1),
(2) Date: Sep. 11, 2019

(87) PCT Pub. No.: WO2018/166610
PCT Pub. Date: Sep. 20, 2018

(65) Prior Publication Data
US 2020/0011977 A1    Jan. 9, 2020

(51) Int. Cl.
*G01S 7/497* (2006.01)
*G01S 7/481* (2006.01)
(Continued)

(52) U.S. Cl.
CPC .............. *G01S 7/497* (2013.01); *G01S 7/484* (2013.01); *G01S 7/4815* (2013.01); *G01S 7/4868* (2013.01)

(58) Field of Classification Search
CPC ...... G01S 7/4815; G01S 7/484; G01S 7/4868; G01S 7/497
See application file for complete search history.

(56) References Cited

U.S. PATENT DOCUMENTS

| 5,241,315 A | 8/1993 | Spinhirne |
| 6,744,470 B1 | 6/2004 | Kalshoven, Jr. et al. |

(Continued)

FOREIGN PATENT DOCUMENTS

| EP | 1489398 A1 | 12/2004 |
| EP | 2587276 A1 | 5/2013 |

(Continued)

OTHER PUBLICATIONS

"Laser hazard distance chart—Laser Safety Facts," Web page <www.lasersafetyfacts.com/hazard_distance_chart.html>, Nov. 15, 2014, retrieved from Internet on Feb. 28, 2023.

*Primary Examiner* — Mohammed S Rahaman
(74) *Attorney, Agent, or Firm* — BROWDY AND NEIMARK, P.L.L.C.

(57) ABSTRACT

The invention relates to a method of an optimal arrangement in time and space of $n_{src}$ multiple laser emitters and a detector for a remote sensing application, comprising setting a target time unit integration time $t_p$; —translating said time unit integration time into a reduced time $\tau_p$ and its corresponding power increase factor $\eta^{-1}$; —repeating for every emitter k of said plurality of $n_{src}$ emitters the steps of: —waiting for a given offset duration $t_{offset,k}$; —activating both the laser emitter k, with a power output corrected by $\eta^{-1}$, and the detector for a duration of $\tau_p$; —deactivating said emitter k and detector after duration $\tau_p$; —flagging emitter k to be kept off for the subsequent duration $t_{off}=t_p-\tau_p$. The invention further relates to a device implementing said method.

26 Claims, 5 Drawing Sheets

(51) Int. Cl.
*G01S 7/484* (2006.01)
*G01S 7/486* (2020.01)

(56) References Cited

U.S. PATENT DOCUMENTS

| | | | |
|---|---|---|---|
| 6,826,204 | B2 | 11/2004 | Kennedy et al. |
| 7,583,364 | B1 | 9/2009 | Mayor et al. |
| 7,809,182 | B2 | 10/2010 | Kirschner |
| 8,724,097 | B2 * | 5/2014 | Pohl ................... F16P 3/144 |
| | | | 372/29.014 |
| 9,048,609 | B2 * | 6/2015 | Kim ...................... G01S 17/04 |
| 2006/0145062 | A1 * | 7/2006 | Boehlau ............... G01S 7/4811 |
| | | | 250/221 |
| 2013/0101176 | A1 * | 4/2013 | Park ..................... G01S 17/36 |
| | | | 382/106 |
| 2013/0235203 | A1 | 9/2013 | Billington et al. |
| 2015/0138529 | A1 * | 5/2015 | Singer .................. G01S 7/497 |
| | | | 356/4.01 |
| 2015/0160175 | A1 | 6/2015 | Knox et al. |
| 2015/0340390 | A1 | 11/2015 | Wall et al. |
| 2015/0364635 | A1 | 12/2015 | Bodlovic et al. |
| 2018/0203099 | A1 * | 7/2018 | Kiehn ................... G01S 17/931 |
| 2018/0259623 | A1 * | 9/2018 | Donovan .............. G01S 7/4815 |

FOREIGN PATENT DOCUMENTS

| | | | | |
|---|---|---|---|---|
| WO | | 2010020755 A2 | 2/2010 | |
| WO | | 2015004213 A1 | 1/2015 | |
| WO | WO | 2015004213 A1 * | 1/2015 | ............... G01C 7/04 |

* cited by examiner

METHOD AND DEVICE FOR OPTIMIZING THE USE OF MULTIPLE EMITTERS AND A DETECTOR IN AN ACTIVE REMOTE SENSING APPLICATION

TECHNICAL FIELD

The present invention relates to a method and a device for optimizing the use of multiple emitters and detector in an active remote sensing application. More specifically, the present invention optimizes said use of multiple emitters and detector with regard to eye-safety of the used laser emitter, the signal to background ratio in the detection, and the power consumption of the detector.

PRIOR ART

Remote sensing refers to a method to acquire information about certain properties of a target under investigation, without being in physical contact with said target. There are active and passive methods.

Passive methods could for example involve to analyze satellite photographs, and to infer on the topography of the landscape from said photographs, or to deduce the electricity use of a certain region based on the light pollution captured in night photographs. These examples are of passive nature as the satellite doesn't actively irradiate the target. Instead, it uses the light emitted by third party contributors, namely the sun and artificial lighting from, for example, cities.

In active remote sensing applications the sensing device actively irradiates the target under investigation, as it acquires the information. Flash photography is one example. More general, active remote sensing is typically referred to under the name radar (RAdio Detection And Ranging), lidar (Light Detection And Ranging), or sonar (SOund Navigation And Ranging), depending on whether the irradiation is of electromagnetic (radio wave or light) or acoustic nature, respectively.

Devices used for remote sensing typically face challenges posed by environmental conditions, technical limitations, and juristic regulations. Environmental challenges could be, for example, temperature or sun irradiation. Technical limitations could be related to the physical maximum transmission or minimum detection power. Juristic regulations could for example restrict the power of the transmitted radiation. Improving a remote sensing device means to optimize its performance within the boundaries given by these challenges.

An active remote sensing application typically has a signal transmitter, a receiver, and a processing unit. The processing unit on the one hand controls both transmitter and receiver. On the other hand, the processing unit evaluates the data relayed from the receiver. Of said relayed data, a part is correlated with the transmitted signal. The rest of said relayed data represent noise or background contributions. These contributions are not correlated with the signal, but originate from the environment and/or the receiver itself. The signal contributions are typically outnumbered by the noise and background contributions.

The performance of a remote sensing application is thus given by its ability to filter out the signal contributions among the noise and background. In order to enhance this performance there are typically two possibilities. First, the power of the signal transmission can be increased. The more signal contributions there are among the noise and background contributions, the easier it is to filter out the relevant data. Second, each receiver comes with a certain threshold of noise equivalent power. Below this threshold the signal contributions cannot be distinguished from the noise and background contributions typically brought in by the receiver itself. Hence, beside an increase in signal transmission, one can increase the sensitivity of the receiver; typically by selecting and/or discarding a certain type when choosing a receiver.

The sensitivity of the receiver is ultimately limited by the laws of physics. For example, if one works with light, if the remote sensing application uses a receiver sensitive to single photons, this sensitivity cannot be improved much further. Respectively, different single photon detectors show different photon detection probabilities. But the difference between one another remains in the percentage of quantum efficiency. Such receivers could be (Geiger mode) avalanche photo diodes (APDs), silicon photo multipliers (SiPMs), or single-photon avalanche diodes (SPADs).

Likewise, the emitted power cannot be increased at will either. Thereby, the emission maximum is hardly in question.

Document U.S. Pat. No. 6,826,204, for example, discloses a method to use a laser with low duty-cycle in order to reach increased pulse peak power with respect to the continuous wave emission power. However, such lasers are intended for material processing. A laser used for remote sensing is typically limited to much lower limits: they're typically purposed to be used among humans, who in many use cases aren't equipped with personal safety accessories. For such purposes eye-safety limits restrict the emitted power typically much earlier than the technical ones.

In terms of laser eye-safety, an overview of a few concepts is given first; throughout the rest of the present disclosure we refer in several occasions to these concepts. A person skilled in the art is aware about the eye-safety related concepts imposed for laser emission. Therefore the overview is restricted to only those aspects considered as relevant for the present invention, and that is part of the relevant prior art. We stick primarily to the notations used by the international standard IEC 60825-1:2014, "Safety of laser products—Part 1: Equipment classification and requirements," Edition 3, 2014. However, the American National Standard for Safe Use of Lasers, ANSI Z136.1, and the ICNIRP (International Commission on Non-Ionizing Radiation Protection) guidelines on exposure limits published in Health Phys. 105(3), 2013, doi:10.1097/HP.0b013e3182983fd4 are equivalent, as for example explained in B. J. Lund and K. Schulmeister, "On the exposure limits for extended source multiple pulse laser exposures," J. of Laser Appl. 25(4), 2013, doi:10.2351/1.4802761. For convenience, in FIG. 1, the differences in symbol notation between these three publications is listed. This way people used to either of the notations can easily follow the present description.

According to laser eye-safety, emission with wavelength 400 nm$<\lambda \leq$700 nm is considered visible. For visible emission the human eye has a natural aversion mechanism: the eye lid closes. Because of this blink-reflex some visible lasers benefit from a relaxed certification, during which the maximum exposure duration is limited to 0.25 s. The wavelength range between 700 nm$<\lambda \leq$1400 nm is considered invisible, but the eye is still transparent for such radiation. Consequentially, the range 400 nm$<\lambda \leq$1400 nm is called the retinal hazard region: emission within this spectral range can reach the retina, and by means of the eye's lens can be focused onto a small spot. Radiation corresponding to $\lambda>$1400 nm is also invisible. However, since light corresponding to these wavelengths is absorbed already at the eye's cornea, before entering the eye. Therefore, what determines the laser class is the power density present at the cornea; no additional focusing effect needs to be accounted for. This can lead to a permitted exposure limit orders of magnitude higher than the limit given for the retinal hazard region.

Beside wavelength, the exposure duration plays a key role in examining eye-safety. The allowed peak power tends to increase as the exposure duration is reduced. Usually, the exposure duration is set equal to the emitted pulse duration. If a source doesn't emit pulses but in continuous wave instead, this emission can be seen as pulsed with pulse duration equal to the extreme value $T_2$, which takes into account involuntary eye movements, so that different sites in the eye are considered to be exposed. Continuous wave emitting scanning devices—which emit in different directions over time—can in some cases be interpreted as pulsed emitters with the pulse duration equal to the time the displacing beam needs to cross the eye.

The retinal hazard region furthermore knows a parameter that takes into account the apparent size of the laser source. The eye can be seen as an imaging apparatus which images the apparent source onto the retina. The light entering the eye is thus concentrated within the area of said image. The larger this image, the larger is also the allowed emission limit of the source. The image size depends on the distance from the source. This is why the source size is accounted for not by its physical dimensions, but by its subtended angle. For example, a source of x=1 cm diameter, seen at a distance of R=10 cm subtends an angle of about x/R=α=100 mrad. The same source seen from a distance of R=1 m creates a much smaller image α=10 mrad.

For a safety analysis one has to always consider the most hazardous and/or restrictive position, which often means a situation such that the subtended angle is smallest. The smallest angle that needs to be accounted for is $\alpha_{min}$=1.5 mrad, the eye cannot create images smaller than the equivalence of this. Sources with $\alpha \leq \alpha_{min}$ are called small sources. Sources with $\alpha > \alpha_{min}$ are called large and/or extended sources. Collimated lasers typically need to be considered as small sources: even if the source is extended from close by, since the power density in a collimated beam doesn't diminish over distance, larger distances result in equal accessible power with smaller subtended angles, and thus represent a more hazardous situation. On the other hand, a large diameter collimated beam—with a diameter larger than the eye's pupil—can be beneficial for eye-safety as only a fraction of the emission can enter the eye.

In the case a laser source is composed of an array of multiple single sources the eye-safety analysis has to account for the presence of this plurality of sources. Namely, the safety analysis, and thus laser classification, has to consider the emission at the most restrictive position, in the most restrictive situation. For example, a source array could contain four identical sources. If the whole array were considered as the safety relevant source, the quadrupled single source power would have to be below the regulatory limit. On the other hand, the regulatory limit could be higher for the array than for the single source because the subtended angle α given by the array as a whole could be significantly larger than the one of the single source.

Likewise, it is important to stress that the apparent source is not necessarily the source of the original emission. It can be, for example, a virtual image of the original source, or the emission from a diffuser, or in some cases it can be the beam waist of a focused beam. Finding the exact place and size of the apparent source can be difficult and is beyond the scope of the present invention. An overview is for example given in K. Schulmeister, "'The Apparent Source'—A Multiple Misnomer," ILSC conference proceedings, p. 91-98, 2005.

In literature, several attempts are known which try to increase or circumvent the limit of the allowed emission power mainly by working with wavelength and/or exposure duration.

In Mayor et al. U.S. Pat. No. 7,583,364, the explained spectral response of the eye is exploited to operate a powerful eye-safe lidar at λ=1.5-1.8 μm.

In Pohl et al. U.S. Pat. No. 8,724,097, two overlapping lasers, one invisible and one visible are used. The visible laser is supposed to induce the aforementioned blink-reflex in order to increase the safety level for the emission of the invisible source. Such a system has the disadvantage that the allowed emission limit of the two sources combined need to be below the regulated limit, such that the eventual power increase is rather low. Besides, such a system would need additional safety features to ensure the invisible light doesn't emit if the visible source is out of order, for example; which adds cost and complexity.

In Harris et al. WO2010020755, a collimated laser beam is used in a lidar, whose emission angle is changed from time to time. For the lidar acquisition the change in angle is irrelevant, in their case. But by exposing different sites (e.g. of the eye) the average exposure power is reduced, so that they claim increased eye-safety. As they note, for this decrease in average power exposure to potentially increase eye-safety, the beam displacement has to be in the order of the beam diameter. This implies either the emission angle has to change by a large amount, or there are means installed to prohibit humans to enter a zone too close to the source. In many applications these trade-offs are not realistic.

Such external safety mechanisms are for example used in Billington et al. US20130235203 in order to employ strong lasers to illuminate a scene. The safety mechanism in their case is a proximity detector adapted to turn off the laser upon detecting something within a pre-determined distance.

In Spinhirne U.S. Pat. No. 5,241,315, the blink reflex applicable for visible lasers, which helps with their eye-safety concerns, is also mentioned. The main technique to increase eye-safety, however, is to expand the diameter of their collimated beam. A large diameter collimated beam requires a condenser lens of at least the same diameter, which leads to a large and bulky over-all system. A Geiger mode Avalanche Photo Diode (GAPD) is mentioned as receiver.

In Hollander et al. EP1489398 they use multiple sources in order to increase the total optical power emitted by their device.

Beside the strategies highlighted in the prior art, a mere increase in sensitivity or emission power is often not feasible. Instead, one needs to use the receiver and/or transmitter more efficiently. As already mentioned, the received radiation typically contains contribution corresponding to a fraction of the transmitted signal, and contributions corresponding to background emitters. In order to increase the efficiency to detect the signal within the received contributions one has to preselect what part of the detectable radiation one wants to analyze in an attempt to find the emitted signal.

In Spinhirne U.S. Pat. No. 5,241,315, a bandpass wavelength filter is employed to suppress a large part of the background contributions. Light with a wavelength other than the emitted wavelength clearly doesn't contain the sought-after signal contributions. This allows to discard the large majority of background contributions coming from, say, the sun in the form of daylight.

In Kirschner U.S. Pat. No. 7,809,182, the background contributions is suppressed in the captured image according to a precharacterization. This precharacterization involves to acquire two images: one during the irradiation (positive, or P-image), one without the irradiation (negative, or N-image). In such an approach the two images can for example be subtracted and thus a background suppressed result be obtained. In other words, they use an N-image to calibrate the camera to subtract the expected background from the P-image. In their specific invention they try to infer from the background level present in the N-image to the background contributions present in the P-image. For this the algorithm needs to have a model of the background contribution. If this algorithm ends up using the wrong model, for example a black body radiation instead of another laser, their proposed method may fail to converge to a solution.

Additionally, the method implies that the signal corresponding to the emitted laser is significantly more powerful than the corresponding spectral contribution of the sun. This in turn implies a relatively strong laser, and/or it means that the performance of the method overall is limited by the signal to background ratio (SBR) present in the P-image alone. In the difference of two random variables, the expectation values of the two is subtracted. On the other hand, the variance is additive. If we consider signal and background to be the expectation values of the respective random variables, the SBR can improve by taking into account the two P- and N-images. However, if we take the variance as an indicator of the noise components in the resulting image, the signal to noise ratio (SNR) actually worsens. In many cases this is undesirable.

In Kalshoven et al. U.S. Pat. No. 6,744,470, they try to capture a video of a scene in which a pulsed laser highlights a certain point within said scene. The pulse duration is shorter than a frame duration. They increase the shutter speed of the camera for the frames captured during the time the laser is on (P-frames, in reference to U.S. Pat. No. 7,809,182), compared to the frames without laser light (N-frames). This method has the advantage that still all of the signal is captured (the laser emission) but only a limited amount of background. Consequentially, the P-frames themselves show an improved SBR.

Once we work with a single photon sensitive detector (SPAD, APD, or SiPM) an important background contribution originates not from environmental photons, but from the detector itself in the form of dark current or dark counts. Temperature is an important parameter regarding dark count rate (DCR). Therefore, one way to reduce DCR is to cool down the detector. This is for example highlighted by Bodlovic et al. US20150364635. Such active and external measures typically increase cost and complexity of the end device.

Beside active measures applied during operation, strategies are known to mitigate DCR from a design point of view. In Boisvert et al. US20150340390, for example, they incorporate DCR suppression elements into the sensing substrate. This type of solution brings in design constraints which in some cases cannot be balanced with more fundamental design requirements.

The present invention builds on top of the concepts introduced in prior art, while overcoming several of the highlighted drawbacks and limitations.

DISCLOSURE OF THE INVENTION

It is the aim of the present invention to provide a method to arrange multiple laser emitters and a photo-sensitive detector such that the available optical budget is optimized with respect to eye-safety, the signal to background ratio of the detection, the power consumption of the detector when working in a remote sensing configuration, and the number of measurements acquired per time. It is further the aim of the present invention to provide a device implementing said method.

According to the present invention, the aforementioned aim is achieved with a method for remote sensing by means of a plurality of $n_{src}>1$ independent emitters and at least one detector, comprising at least the steps of:
 setting a target time unit integration time $t_p$;
 translating said time unit integration time into a reduced time $\tau_p$ and its corresponding power increase factor $\eta^{-1}$;
 repeating for every emitter k of said plurality of $n_{src}$ emitters the steps of:
 waiting for a given offset duration $t_{offset,k}$;
 activating both the laser emitter k, with a power output corrected by $\eta^{-1}$, and the detector for a duration of $\tau_p$;
 deactivating said emitter k and detector after duration $\tau_p$;
 flagging emitter k to be kept off for the subsequent duration $t_{off}=t_p-\tau_p$.

Preferably, said target integration time unit $t_p$ results from a target frame rate.

Advantageously, during the off-time $t_{off}=t_p-\tau_p$ communication is exchanged with an external device and said communication updates configurations.

Advantageously, the independence of the plurality of emitters is given by their geometrical arrangement around the detector such that their minimum distance from each other is at least $x=2\ L^{(restrict)}\tan(\theta_{divergence}/2)$.

Moreover, the translation of said time unit integration time $t_p$ into a reduced time $\tau_p$ is obtained by means of a look-up-table (LUT) listing pre-calculated values.

The translation of said time unit integration time $t_p$ into a reduced time $\tau_p$ is obtained by calculating it continuously according to the time domain and/or the spectral region.

In another embodiment, the translation of said time unit integration time $t_p$ into a reduced time $\tau_p$ is obtained by providing coarse steps from a look-up-table (LUT) listing pre-calculated values and by calculating interpolated value.

Moreover, it operates in a continuous acquisition mode set up to acquire frames of $t_p$ integration time each in order to obtain a frame rate $1/t_p$.

Moreover, it operates in such a way that it acquires a single acquisition following a trigger signal and then waits for a subsequent trigger signal.

Advantageously, it delays the activation of at least one of the laser emitter and photo-sensitive detector by an additional amount of $t_{delay}$, $\max[(\eta_{preceding}-\eta)t_p, 0]$, with $\eta_{preceding}$ being the inverse of the power increase factor of the preceding acquisition.

Moreover, if the trigger signal arrives during the idle mode duration $t_{off}$, said trigger signal is ignored or delayed until said duration has timed out.

Another object of the invention concerns a device
 for remote sensing by means of a plurality of $n_{src}$ 1 independent emitters and at least one detector, comprising $n_{src}$ laser emitters, a photo-sensitive detector and a logic circuit controlling the laser emitters and the photo-sensitive detector and a computer program product embodied in one or more computer readable medium(s) having computer readable program code embodied thereon executable by a processor to perform actions comprising:
 setting a target time unit integration time $t_p$;
 translating said time unit integration time into a reduced time $\tau_p$ and its corresponding power increase factor $\eta^{-1}$;

repeating for every emitter k of said plurality of $n_{src}$ emitters the steps of:

waiting for a given offset duration $t_{offset,k}$;

activating both the laser emitter k, with a power output corrected by $\eta^{-1}$, and the detector for a duration of $\tau_p$;

deactivating said emitter k and detector after duration $\tau_p$;

flagging emitter k to be kept off for the subsequent duration $t_{off}=t_p-\tau_p$.

Preferably, said target integration time unit $t_p$ results from a target frame rate.

Advantageously, communication is exchanged with an external device during the off-time $t_{off}=t_p-\tau_p$ and said communication updates configurations.

Advantageously, the $n_{src}$ emitters are arranged around the photo-sensitive detector such that their minimum distance from each other is at least $x=2 L^{(restrict)} \tan(\theta_{divergence}/2)$.

Moreover, the translation of said time unit integration time $t_p$ into a reduced time $\tau_p$ is obtained by means of a look-up-table (LUT) listing pre-calculated values.

In a first embodiment, the translation of said time unit integration time $t_p$ into a reduced time $\tau_p$ is obtained by calculating it continuously according to the time domain and/or the spectral region.

In another embodiment, the translation of said time unit integration time $t_p$ into a reduced time $\tau_p$ is obtained by providing coarse steps from a look-up-table (LUT) listing pre-calculated values and by calculating interpolated value.

Moreover, it operates in a continuous acquisition mode set up to acquire frames of $t_p$ integration time each in order to obtain a frame rate $1/t_p$.

Preferably, it operates in such a way that it acquire a single acquisition following a trigger signal and then wait for a subsequent trigger signal.

Advantageously, it comprises means for delaying the activation of at least one of the laser emitter and photo-sensitive detector by an additional amount of $t_{delay}=\max[(\eta_{preceding}-\eta)t_p, 0]$, with $\eta_{preceding}$ being the inverse of the power increase factor of the preceding acquisition.

If the trigger signal arrives during the idle mode duration $t_{off}$, said trigger signal is ignored or delayed until said duration has timed out.

It further comprises an external device sending said trigger signal, said external device being a screen, a projector, a computer, or a server.

BRIEF DESCRIPTION OF THE DRAWINGS

The invention will be further elucidated by means of the following description and the appended drawings.

DESCRIPTION OF PREFERRED EMBODIMENTS

Figures 1, 2:
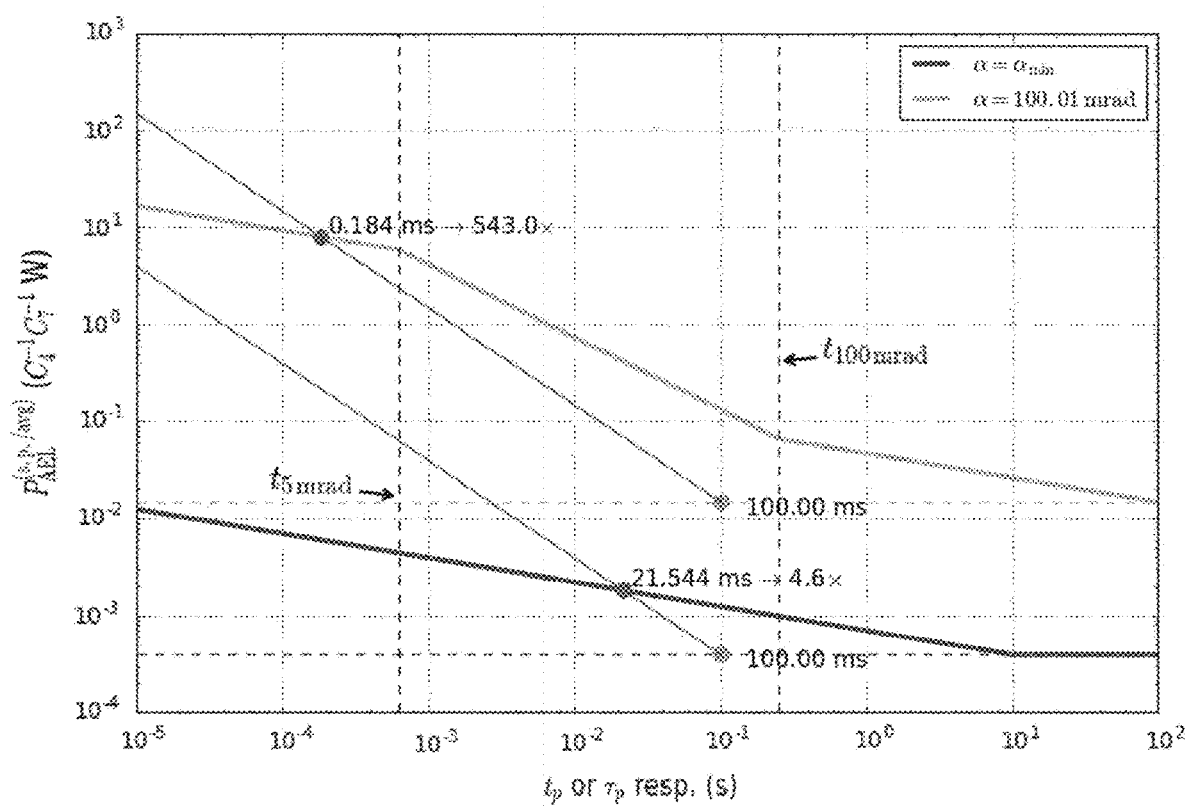
FIG. 1 is a list of equivalent symbol names over different reference documents regarding eye-safety.
FIG. 2 illustrates the presented calculations for the retinal hazard region which can be understood graphically when plotting the allowed emission power limit in a double logarithmic plot.

The present invention will be described with respect to particular embodiments and with reference to certain drawings. The invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In the section listing prior art we have already introduced several eye-safety concepts needed to understand the present invention. Before explaining the preferred embodiments we need to state some concepts in more detail. Again, we stick primarily with the notations used by the international standard IEC 60825-1:2014, "Safety of laser products—Part 1: Equipment classification and requirements," Edition 3, 2014. However, the American National Standard for Safe Use of Lasers, ANSI Z136.1, and the ICNIRP (International Commission on Non-Ionizing Radiation Protection) guidelines on exposure limits published in Health Phys. 105(3), 2013, doi:10.1097/HP.0b013e3182983fd4 are equivalent, as for example explained in B. J. Lund and K. Schulmeister, "On the exposure limits for extended source multiple pulse laser ex-posures," J. of Laser Appl. 25(4), 2013, doi: 10.2351/1.4802761. For convenience, in FIG. 1 we list the differences in symbol notation between these three publications. This way people used to either of the notations can easily follow the present description.

The mentioned regulatory documents state different laser classes. For each laser class there is a defined tabulated accessible emission limit (AEL); if the laser device emits a higher power than this limit corresponding to a certain target laser class, said laser device cannot be certified as this class, and a higher class needs to be considered instead. This AEL is stated as two criteria: the average power criterion and the single pulse energy criterion. These two criteria typically give two different emission limits. The lower of the two limits—hence stating the more restrictive criterion—implies the laser class of the laser device.

To fully understand these two criteria two time scales are important: $T_2$ takes into account involuntary eye-movements relevant for the retinal hazard region, $T_i$ accounts for tissue reaction time. Exposures of durations $t > T_2$ will be irradiated on different sites on the retina. Consequentially, this is the maximum exposure duration one needs to consider to assess pulse trains in the retinal hazard region; see for example R. Henderson and K. Schulmeister, "Laser Safety," IOP Publishing Ltd., 2004. Tissue cannot react faster than $T_i$, the thermal confinement time. Therefore, pulses falling within duration $T_i$ have to be summed together. As a consequence, a pulsed emission with pulse repetition rate (PRR) $f_{PRR} \geq 1/T_i$ is considered (quasi-)continuous wave. Even if the laser emits at a low duty-cycle with pulse durations much shorter than the thermal confinement time $t_p \ll T_i$, from a tissue point of view the emission is not pulsed.

In the following described embodiments, we refer to pulses with pulse durations $t_p > T_i$. However, a person skilled in the art will understand that, given the statement above, these pulses themselves can consist of pulses $t_p \ll T_i$ emitted with a PRR $f_{PRR} \geq 1/T_i$, such that from a tissue point of view the relevant pulse duration is given by $t_p$.

The average power criterion for class 1 laser devices emitting in the retinal hazard region 400 nm $< \lambda <$ 1400 nm reads as (see FIG. 1 regarding correction factors $C_x$)

$$P_{AEL}^{(avg)} = 7 \times 10^{-4} T_2^{-0.25} C_4 C_6 C_7 W. \qquad \text{(Eq. 1)}$$

The limiting energy for single pulses emitted in the retinal hazard region according to the single pulse criterion for pulses of duration $T_i \leq t_p \leq T_2$ reads as $$Q_{AEL}^{(s.p.)} = 7 \times 10^{-4} t_p^{-0.75} C_4 C_5 C_6 C_7 J. \qquad \text{(Eq. 2)}$$

For triangular or rectangular pulses equation (Eq. 2) can be conveniently rewritten as allowed peak power: peak power P relates to pulse energy Q with pulse duration t as P=Q/t (this is for triangular and rectangular pulses, for a more in-depth discussion see for example R. Henderson and K. Schulmeister, "Laser Safety," IOP Publishing Ltd., 2004). It is therefore, $$P_{AEL}^{(s.p.)} = 7 \times 10^{-4} t_p^{-0.25} C_4 C_5 C_6 C_7 W. \qquad \text{(Eq. 3)}$$

This representation of the single pulse criterion has the same dimensionality (i.e. power) as the average power criterion (Eq. 1). Working with the same dimensionality facilitates to explain the present invention. Additionally, apart from correction factor $C_5$ the power equations can be written as only one replacing $t_p$ with $\min(t_p, T_2)$. A person skilled in the art should understand that for pulses with a more complex pulse shape than triangular or rectangular the pulse energy is the regulated quantity (as given by (Eq. 2)) and while the disclosed insights still apply, the exact calculation may be more cumbersome.

Correction factor $C_6$ depends on the size of the subtended angle $\alpha$ of the apparent source—and thus image projected onto the retina—and the pulse duration $t_p$. It is $$C_6(\alpha, t_p) = \frac{\min[\max(\alpha, \alpha_{min}), \alpha_{max}(t_p)]}{\alpha_{min}},$$

with $\alpha_{min} = 1.5$ mrad, and the time dependent $\alpha_{max}$ given by $$\alpha_{max}(t_p) = \min[\max(5m \text{ rad}, 200\sqrt{t_p} m \text{ rad}), 100 m \text{ rad}].$$

Given the definition of $\alpha_{max}$ one can find a characteristic time $t_\alpha$ for which $\alpha_{max}(t_\alpha) = \alpha$, see for example in B. J. Lund and K. Schulmeister, "On the exposure limits for extended source multiple pulse laser exposures," J. of Laser Appl. 25(4), 2013, doi:10.2351/1.4802761. This characteristic time is $$t_\alpha = \left( \frac{\min[\max(5 \text{ mrad}, \alpha), 100 \text{ mrad}]}{200 \text{ mrad}} \right)^2.$$

It is thus possible to rewrite correction factor $C_6$ as $$C_6(\alpha, t_p) = \frac{\max(\alpha, \alpha_{min})}{\alpha_{min}} \frac{\max(\alpha, \alpha_{max}(t_p))}{\alpha_{max}(t_p)};$$

for which there is a domain in pulse duration for which $$C_6(\alpha, t_{5 \text{ mrad}} \leq t_p < t_\alpha) = \frac{\alpha^2}{200\alpha_{min}} t_p^{\frac{-1}{2}}$$

correction factor $C_6$ is not constant but increases for shorter pulse durations.

The formulas to determine the power limits corresponding to the mid and far infrared region $\lambda > 1400$ nm differ from those of the retinal hazard region. In order to facilitate the discussion of the mid and far infra-red (MIR and FIR) spectral region, we define a time breakpoint $T_3$ which acts as the equivalent of $T_2$ of the retinal hazard region. This breakpoint does not exist in the cited eye-safety regulations, we include it to write the corresponding equations in a more consistent way. For 1400 nm $< \lambda \leq$ 1500 nm and 1800 nm $\leq$ 4000 nm it is $T_3 = 0.35$ s. For $\lambda \geq 4000$ nm it is $T_3 = 10$ s. In the spectral region between 1500 nm $< \lambda <$ 1800 nm it is $T_i = 10$ s, so that the present invention doesn't apply: a repetitively pulsed emission (with pulses shorter than 10 s) has to be considered as quasi continuous wave, not pulsed. For an emission of this spectral region with pulses of duration $t_p \geq T_i$ it is $$P_{AEL}^{(avg/s.p.)} = 4.4 \times 10^{-3} [\min(t_p, T_3)]^{-0.75} W. \qquad \text{(Eq. 4)}$$

Up to this point we have not yet introduced a new concept. The stated formulas follow directly from the cited regulation. We have only reformulated the included equations in versions that are slightly more convenient for the discussion to follow.

The limits posed by the average power criterion (Eq. 1) and the single pulse (peak power) criterion (Eq. 3)—and (Eq. 4), respectively—we can interpret as indeed just that, a limit on the allowed emitted power and energy, respectively. Alternatively, we can say the average power criterion tells us how many photons we're allowed to emit per unit time (typically per second)—however, the criterion doesn't say anything about how those photons can be emitted in time.

The single pulse criterion tells us how densely in time we're allowed to pack the emitted photons.

We can obtain the value of allowed average power by combining various pulses of different shapes. One way to redistribute this average power is to take the energy emitted during a time unit $t_p$ and to pack it in a pulse of duration $\tau_p = \eta t_p$. A pulse of this $\tau_p$ duration, with an amplitude $F = \eta^{-1}$ higher than the amplitude of the initial pulse, ends up at the same average energy as emitted during the initial unit time.

For example, let's assume we consider a continuous wave (cw) emission and look at $t_p = 100$ ms during which we emit a constant $Q_p = 0.1$ q J. The cw-state means, this pulse-equivalent is emitted with a pulse Q repetition rate (PRR) of $f_{PRR} = 1/(100 \text{ ms}) = 10$ Hz. The average power is $P_p = Q_p f_{PRR} = Q_p/t_p = 1$ q W. We can reduce the pulse duration for example with factor $\eta = 0.1$ (i.e. 10 ms) and at the same time increase the peak power by a factor of $F = \eta^{-1} = 10$. With these two measures the pulse energy remains (peak) $Q_p' = P_p^{(peak)} \tau_p F = Q_p = 0.1$ q J. As long as we keep $f_{PRR} = 10$ Hz, the average power emitted is the same as before. What has changed, however, is that before we have considered a cw emission, i.e. an emission with 100% duty-cycle. In the redistributed emission we emit the same energy (/power) but in pulsed form. The duty-cycle of this pulsed emission corresponds to $\eta = 10\%$. The peak power of such a redistributed pulse scales as (with $P_{AEL}^{(avg)}$ from (Eq. 1))

$$P_{AEL}^{(peak,avg)} = P_{AEL}^{(avg)}/f_{PRR} t_p \propto t_p^{-1}.$$

However, even if we keep the average power constant, we cannot redistribute the emission arbitrarily. According to the single pulse criterion the allowed peak power scales as (from (Eq. 3)) $P_{AEL}^{(s.p.)} \propto t_p^{-0.25}$. Put explicitly, the single pulse peak power scales slower than the average power criterion would allow; $|-0.25| < |-1|$. For the classification of the laser device the more restrictive of the two limits is relevant. This means, we can redistribute the pulse $t_p^{-1}$ as suggested by the average power criterion until the resulting peak power hits the limit posed by the single pulse $t_p^{-0.25}$ criterion.

With $\tau_p^{(crit)}$ we refer to the critical minimum time within which we are allowed to emit the cw equivalent energy of an average power criterion limited emission corresponding to $t_p$. In order to find this critical minimum time we have to consider three time domains, implied by the definition of $t_\alpha$. For each of these time domains we find the limit at the point where the average power criterion limited energy emitted during $t_p$ (it is $Q = P t_p$)—which is reduced to $\tau_p$—is equal to the single pulse criterion of duration $\tau_p$. For simplicity we call the pulse resulting from reducing time unit $t_p$ to $\tau_p$—while keeping the integral constant—a "compressed pulse" of duration $\tau_p$, corresponding to the "uncompressed" time unit $t_p$. In this terminology $\tau_p^{(crit)}$ thus refers to the critically compressed pulse duration and $\eta^{-1}$ to the compression factor.

In the following we derive the theory necessary to understand the disclosed embodiments. We look at the spectral regions corresponding to the retinal hazard region 400 nm $< \lambda \leq 1400$ nm, and the mid and far infrared (MIR and FIR, respectively) region $\lambda > 1400$ nm independently.

For the retinal hazard region, in an initial step we assume $C_5 = 1$ and thus ignore the presence of this correction factor. This simplification is valid only for $\alpha_{min} \leq \alpha \leq 5$ mrad and for $\alpha > 100$ mrad. We will address the regime 5 mrad $< \alpha \leq 100$ mrad later on, after we have introduced the main concepts of the present invention.

For $t_p > T_2^{1/4} t_\alpha^{3/4}$ (resulting in $\tau_p > t_\alpha$) it is (equating the average power criterion with the single pulse criterion)

$$7 \times 10^{-4} T_2^{-0.25} t_p \tau_p^{-1} = 7 \times 10^{-4} \tau_p^{-0.25}, \quad \text{(Eq. 5)}$$

$$\Rightarrow T_2^{-0.25} t_p = \tau_p^{0.75},$$

$$\Rightarrow \tau_p = \tau_p^{(crit)} = T_2^{-1/3} t_p^{4/3},$$

with $$\eta^{-1} = T_2^{1/3} t_p^{-1/3}.$$

For the time domain $T_2^{1/4} t_\alpha^{1/2} t_{5\,mrad}^{1/4} < t_p \leq T_2^{1/4} t_\alpha^{3/4}$ (resulting in $t_{5\,mrad} < \tau_p \leq t_\alpha$) correction factor $C_6$ is not the same for the limit given by the average power criterion as the limit from the single pulse criterion. Together with the definition of $\alpha_{max}$ and $t_\alpha$ stated above it is therefore $$7 \times 10^{-4} T_2^{-0.25} t_p \tau_p^{-1} \frac{\alpha}{\alpha_{min}} = 7 \times 10^{-4} \tau_p^{-0.25} \frac{\alpha^2}{\alpha_{min} \alpha_{max}}, \quad \text{(Eq. 6)}$$

$$\Rightarrow \tau_p = \tau_p^{(crit)} = T_2^{-1} t_\alpha^{-2} t_p^4,$$

with $$\eta^{-1} = T_2 t_\alpha^2 t_p^{-3}.$$

Lastly, for time domain $T_i^{3/4} T_2^{1/4} t_\alpha^{1/2} t_{5\,mrad}^{-1/2} < t_p \leq T_2^{1/4} t_\alpha^{1/2} t_{5\,mrad}^{1/4}$ (resulting in $T_i < \tau_p \leq t_{5\,mrad}$) it follows $$\Rightarrow \tau_p^{(crit)} = T_2^{-1/3} t_\alpha^{-2/3} t_{5\,mrad}^{2/3} t_p^{4/3}, \quad \text{(Eq. 7)}$$

$$\eta^{-1} = T_2^{1/3} t_\alpha^{2/3} t_{5\,mrad}^{-2/3} t_p^{-1/3}.$$

In the above derivations we have simplified correction factor $C_5 = 1$, which we have stated is valid as such only for $\alpha_{min} \leq \alpha \leq 5$ mrad and for $\alpha > 100$ mrad. In the following, we address the range 5 mrad $\leq \alpha \leq 100$ mrad for which $C_5 \neq 1$ in most cases. Correction factor $C_5$ accounts for the exposure to multiple pulses. Namely, if the emission generates N pulses within time $T_2$, it is $C_5 = N^{-1/4}$. This correction factor has to be multiplied with the single pulse limit in order to obtain the limit per pulse in the emitted pulse train. Correction factor $C_5$ applies only to pulses equal to or shorter than 0.25 s, which happens also to be equal to $t_{100\,mrad}$. Depending on the size of the apparent source $\alpha$ this correction doesn't reduce lower than $C_5 = 0.4$ or $C_5 = 0.2$, respectively. With $\alpha_{max}$ being time dependent (see above), B. J. Lund and K. Schulmeister, "On the exposure limits for extended source multiple pulse laser exposures," J. of Laser Appl. 25(4), 2013, doi:10.2351/1.4802761 have demonstrated that the $C_5$ correction factor can be written as a function of pulse duration rather than $\alpha$. Namely, for pulses of duration $\tau_p$ it is for $t_\alpha \leq \tau_p \leq 0.25$ s: $C_5 = \max(N^{-1/4}, 0.4)$; and for $T_i < \tau_p < t_\alpha$: $C_5 = \max(N^{-1/4}, 0.2)$.

To illustrate the consequences of this correction factor we assume the following example. We work with $\alpha = 100$ mrad and we want to divide an average power limited continuous wave (cw) emission into time units of duration $t_p = 100$ ms. These $t_p$ we want to compress into $\tau_p^{(crit)}$ as described above. In other words, we start with a cw emission and turn it into a pulsed emission with pulse repetition rate (PRR) $f_{PRR} = 10$ Hz. For $\alpha = 100$ mrad it is $T_2 = 100$ s. Therefore, there are going to be N=1000 pulses within $T_2$. With $t_\alpha=t_{100\ mrad}=0.25$ s we thus find $C_5=0.2$. Consequentially, the peak power of the emitted pulses has to be reduced by this factor.

In general, in order to calculate $C_5$ we need to know the number of pulses N emitted within $T_2$. This number is given by the pulse repetition rate (PRR) times $T_2$. The PRR results from the intention that we want to emit the same amount of light as an average power limited cw laser: we split this cw emission into time units of duration $t_p$ and emit the corresponding light in the form of pulses of duration $\tau_p$. However, a subsequent pulse we're allowed to emit only after $t_p$. Assuming non-changing $t_p$ the PRR thus follows as $f_{PRR}=1/t_p$.

In order to incorporate $C_5$ in the above derived equations for $\tau_p$ we can replace $T_2$ in said equations with $T_2'=C_5{}^4T_2$, with $C_5=\{0.4, 0.2\}$ corresponding to whether $t_p>t_\alpha$ or $t_p\leq t_\alpha$, as described. Using these correspondingly corrected equations allows also medium sized sources 5 mrad<$\alpha$≤100 mrad to benefit from the disclosed invention.

For the MIR and FIR spectral region the cw emission can be compressed analogously. As mentioned above, for 1500 nm<$\lambda$<1800 nm it is $T_i=10$ s so that the emission cannot be compressed. Apart from this region, however, it is, for $T_3^{3/4}T_i^{1/4}\leq t_p\leq T_3$ (resulting in $T_i\leq\tau_p$)

$$4.4\times10^{-3}T_3^{-0.75}t_p\tau_p^{-1} = 4.4\times10^{-3}\tau_p^{-0.75} \quad \text{(Eq. 8)}$$
$$\Rightarrow T_3^{-0.75}t_p = \tau_p^{0.25}$$
$$\Rightarrow \tau_p = \tau_p^{(crit)} = T_3^{-3}t_p^4$$

with $$\eta^{-1} = T_3^3 t_p^{-3}.$$

Again, in order not to confuse the readers of the present disclosure: time breakpoint $T_3$ does not exist in the cited eye-safety regulation. We have defined this breakpoint in order to be able to write the corresponding equations in a more consistent way; $T_3$ cannot be found in the cited eye-safety regulation.

The above presented equations can be inverted in order to find the uncompressed time unit $t_p$ corresponding to a critically compressed pulse duration $\tau_p^{(crit)}$.

At this point it is important to stress a few points. It is not possible and/or acceptable to increase the emitted laser power beyond the regulatory maximum. The maximum amount of energy—or in other words the maximum number of photons—allowed to emit is given by the average power criterion imposed on a continuously emitting source. It is possible, however, to partition said maximum emission into finite time units of duration $t_p$. It is further possible to emit the energy corresponding to said time unit duration $t_p$ during the shorter time $\tau_p$. This implies a higher peak power during $\tau_p$ with respect to the average power limit imposed on the initial $t_p$. Said increase is given by $\eta^{-1}$ in the above equations. This higher peak power emission still leads to an eye-safe emission configuration if and only if two conditions are met: first, after emitting for $\tau_p$ the laser must be off for the remaining duration $t_{off}=t_p-\tau_p$. This ensures the emitted average power to be constant. Second, the emission duration $\tau_p$ must not be reduced beyond $\tau_p^{(crit)}$, this means it is strictly $\tau_p\geq\tau_p^{(crit)}$. This ensures not to violate the single pulse criterion. The pulse duration could of course still be reduced beyond $\tau_p<\tau_p^{(crit)}$, and also the peak power could still be increased. But said increase in peak power would have to be less than the reduction in pulse duration, thus resulting in a pulse with a smaller integral and thus smaller overall emitted power.

Figure 3:
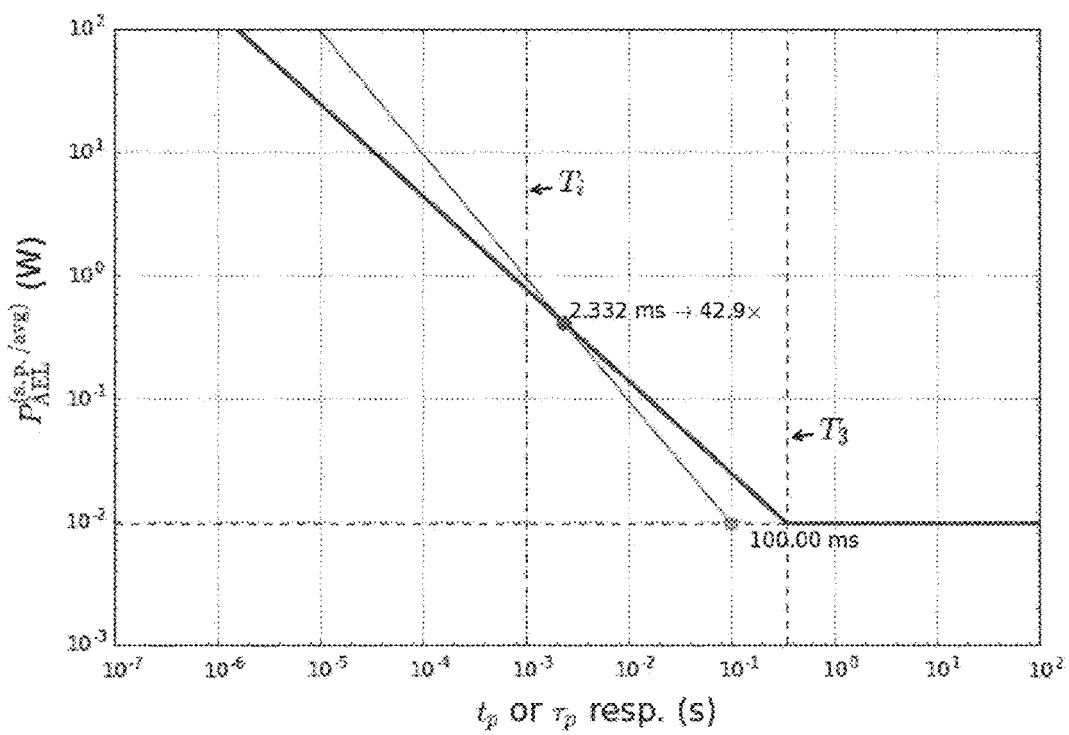
FIG. 3 illustrates the presented calculations for the mid infrared (MIR) region which can be understood graphically when plotting the allowed emission power limit in a double logarithmic plot, FIG. 4 visualizes the presented calculations for medium sized sources.

The stated equations may seem non-intuitive at first. In order to more easily understand the equations it is beneficial to plot the power values corresponding to the accessible emission limit (AEL) corresponding to a certain pulse duration in a double logarithmic graph. In FIG. 2 we illustrate two different $\alpha$ configurations as examples for the retinal hazard region. FIG. 3 illustrates the MIR and FIR regions. More precisely, FIG. 3 corresponds only to 2600 nm≤$\lambda$≤4000 nm, for which $T_3$ corresponds to the indicated vertical line, and for which region it is $T_i=10^{-7}$ s. For 1400 nm<$\lambda$≤1500 nm and 1800 nm≤$\lambda$<2600 nm it is $T_i=10^{-3}$ s as indicated by the correspondingly labeled vertical line.

Figure 4:
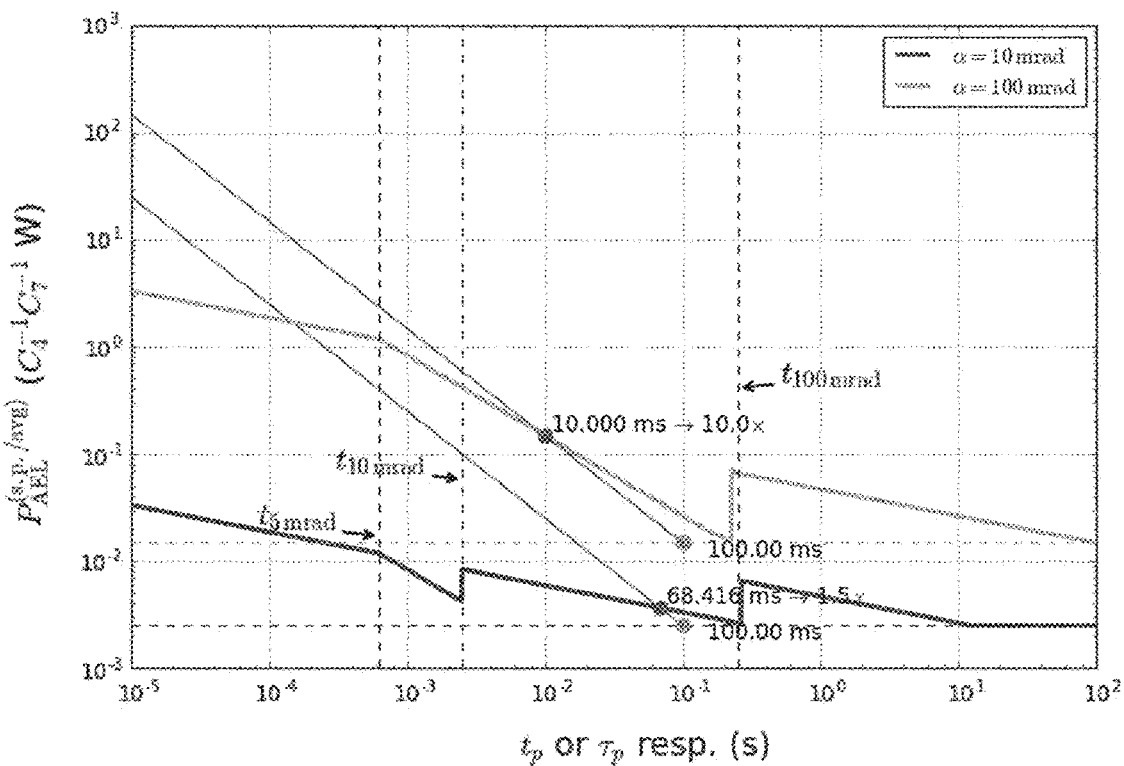

The dashed vertical lines FIG. 2 indicate the three t $\alpha$ related time domains, depending on which one has to work with different formulae. The dashed horizontal lines indicate the limiting average power according to the average power criterion. The solid lines correspond to the single pulse peak power limit. The slope of this solid line is either −¼ or −¾ depending on said time domains. In order to find $\tau_p^{(crit)}$ which corresponds to a certain $t_p$ we can use the showed plot as follows: First, we mark $t_p$ along the dashed horizontal line. In FIG. 2 we have indicated $t_p=100$ ms for both depicted $\alpha$'s. Starting from this marked point we draw a line with slope −1; indicated in red in FIG. 2. This line represents equal average power, if averaged over $t_p$. The point at which this −1 line crosses the line indicating the single pulse peak power limit, corresponds to $\tau_p^{(crit)}$. The ratio between this and the starting point (either in power or time) results in $\eta$ or $\eta^{-1}$, respectively. FIG. 4 shows two examples for $\alpha=100$ mrad, for which $C_5=0.4$ never applies, and $\alpha=10$ mrad, which shows the different $C_5$ domains. Referring to FIG. 2 this means the solid lines indicating the peak power limit have to be linear translated by 1/0.4=5/2 and 1/0.2=5 units (because we consider a plot in double logarithmic scale) within $t_\alpha<t_p<0.25$ s and $t_p\leq t_\alpha$, respectively.

The presented interpretation of the eye-safety regulation together with the thus presented derivations allow us to significantly advance the state of the art regarding remote sensing applications. While the derived equations do not result in an overall increase in allowed total emission power, they provide the basis for using the available power budget in a more efficient way, and on top of that to reduce the power consumption and self-heating on detection side. Accordingly, with reference to FIG. 4 one embodiment of the present invention is an active remote sensing system (10) composed of at least three components: a laser emitter (11), a photo-sensitive detector (12), and a logic circuit (13).

Said laser emitter (11) emits at least one wavelength corresponding to either the retinal hazard region 400 nm<$\lambda$≤1400 nm, or the mid or far infrared region 1400 nm<$\lambda$≤1500 nm or $\lambda$≤1800 nm, respectively. This laser emitter (11) can be any type of laser such as, for example, vertical-cavity surface-emitting lasers (VCSELs), vertical-external-cavity surface-emitting lasers (VECSELs), edge-emitters, gas lasers, fiber laser, and/or dye lasers. The photo-sensitive detector (12) can be, for example, a CCD camera, a CMOS camera, a SPAD-based detector, an APD-based detector, and/or a SiPM-based detector. It should be obvious that the detector (12) has to be adapted for the chosen wavelength of the emitter (11). As such, silicon based detectors (such as CMOS or SiPM) wouldn't work for wavelength about $\lambda$>1100 nm, as silicon is transparent in this spectral range. For this spectral range germanium—or other semiconductor compounds such as InSb, InGaAs, HgCdTe, etc.—based detectors could be used, for example. Furthermore, the detector could convert the radiation of one wavelength into radiation of another wavelength, in order to again be able to use, for example, a silicon based detector. Such a conversion device is, for example, disclosed by Ben-Bassat et al. WO2016067275.

The logic circuit (13) controls the emitter (11) and detector (12) according to the present invention. The logic circuit (13) further enables the input and output interface with an external device (14), such as, for example, a screen, a projector, a computer, or a server. The logic circuit (13) could be implemented as for example software running on a central processing unit (CPU) or a graphics processing unit (GPU), or as hardware implemented on a field-programmable gate array (FPGA), or as a dedicated application-specific integrated circuit (ASIC). A microcontroller unit (MCU) could be used as well. The aforementioned external device (14) could also signify another logic circuit of similar characteristics; external thus indicating logic outside the main logic circuit (13) responsible to interface with emitter (11) and detector (12).

In said first embodiment of the present invention the logic circuit (13) first sets a time unit as a target integration time $t_p$. This setting can come for example from an internal configuration file or registry, or from an external device. The logic circuit (13) subsequently translates said time unit integration time $t_p$ into a critical minimum time $\tau_p^{(crit)}$ and its corresponding critical power increase factor $\eta^{-1}$ according to the equations (Eq. 5-8) given above. This translation can be realized by means of, for example, a look-up-table (LUT) listing pre-calculated values, or the logic circuit (13) calculates on the fly, or a mixed approach wherein the LUT provides coarse steps and an interpolated value has to be calculated. The logic circuit (13) induces the laser emission of the emitter (11) whose power output is adjusted according to $\eta^{-1}$. Simultaneously, the logic circuit (13) also activates the detector (12). The laser emitter (11) and the detector (12) stay activated for the duration of $t_{on}=\tau_p^{(crit)}$, after which time the logic circuit (13) causes the two to deactivate. During the on-time $t_{on}$ the detector (12), for example, increases a dedicated counter in the logic circuit (13) indicating the amount of detected light. This counter could be, for example, a digital counter counting the number of photons detected by a SPAD or an SiPM. Alternatively, this counter could be an analog circuit, for example, if the detector (12) consists of CCD elements. Such analog circuits would then typically be connected with a digital counter in the logic circuit (13) through an analog-to-digital converter (ADC).

The logic circuit (13) then enters a safety mode (off-time) for the subsequent duration of $t_{off}=t_p-\tau_p$. During this time the laser isn't allowed to emit light. Once this off-time $t_{off}$ is over, the logic circuit (13) again reactivates laser emitter (11) and detector (12) according to its instructions, which again can come from an internal configuration file or registry, or from an external device. The system can, for example, operate in a continuous acquisition mode set up to acquire frames of $t_p$ integration time each in order to obtain a frame rate of $1/t_p$. Alternatively, the system could also be configured to acquire a single acquisition following a trigger signal originating from an external device, and then wait for a subsequent trigger signal. In the latter example, if the subsequent trigger signal arrives during the idle mode duration $t_{off}$ the system, for example, either ignores the request or delays it until said duration has timed out.

The mentioned embodiment doesn't involve a state which evaluates and/or transfers the detected data. As such this embodiment wouldn't behave as one would typically expect from an active remote sensing system. Consequentially, in a further embodiment the same characteristics are present as in the one above, but additionally, after the laser emitter (11) and detector (12) on-time $t_{on}$, as the two are deactivated, the logic circuit (13) processes the counter according to a foreseen algorithm, copies the result to a buffer, which is configured such that an external device can read out said result. As a person skilled in the art will understand, processing and buffering does not necessarily have to happen in this order and the mentioned order is but a mere example. It could also be thought of that first the raw data are copied into a buffer and said buffer then being processed. Further, it could also be possible to interleave processing and buffering, for example, in order to continuously ameliorate a statistical estimator of a certain parameter. The exact scheme depends on the particular needs of the remote sensing application (10); for example, whether the detector (12) consists of a plurality of pixels and the application intends to read out the light intensity measured per pixel, or whether the system is a time-of-flight (TOF) system with only a singular detector (12) wherein the detection readings have to be interpreted as distance information, such applications imply different requirements. Analogously, the processing and buffering stage could be skipped entirely so that an external device would directly access the aforementioned counters, for example, in applications which don't need to compress the detection results before reading them out. Additionally, the detection results—either processed or not—are stored in a buffer, the read-out of said detection results by an external device, as specified, can overlap in time with the subsequent on-time of laser emitter (11) and detector (12), during which newly acquired detection data are stored in a pre-buffer stage. The purpose of a buffer is to enable such read-out freedom in the first place.

Figure 5:
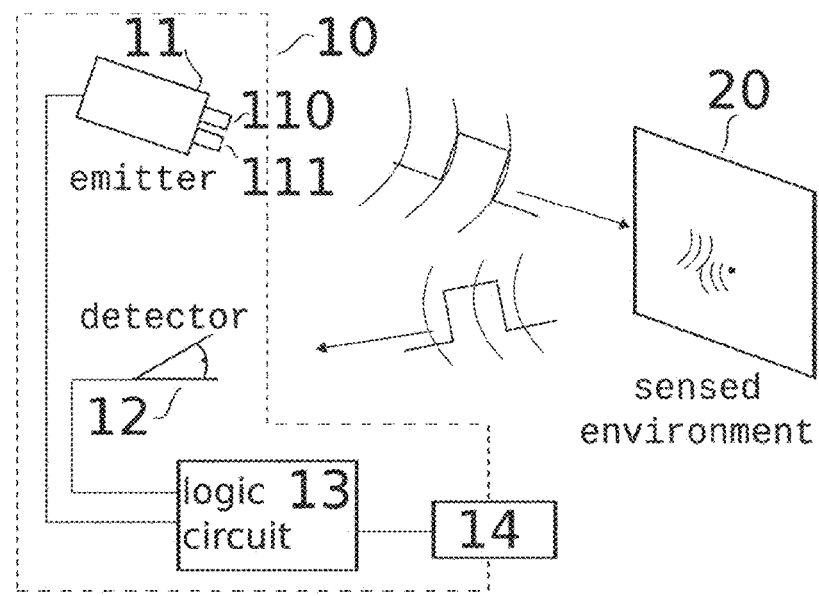
FIG. 5 is a schematic representation of an active remote sensing system according to the invention.
Figure 6:
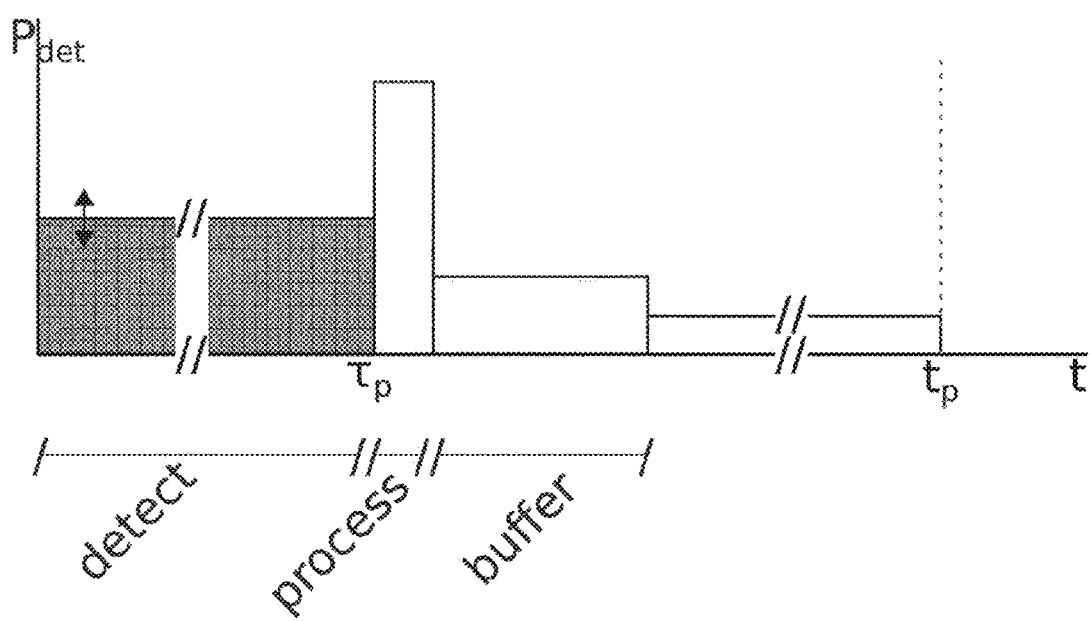
FIG. 6 is an illustration of qualitative power consumption and thus self heating on detection side per sensing cycle of one embodiment.
Figure 7:
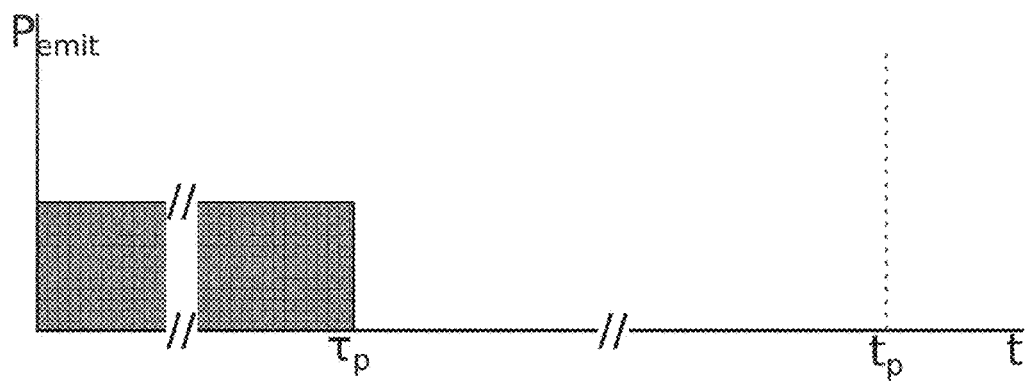
FIG. 7 is an illustration of qualitative power emission per sensing cycle of an embodiment corresponding to a detection profile depicted in FIG. 6.

FIG. 5 illustrates the qualitative power consumption on detection side along the y-axis with respect to the different stages of the mentioned embodiment. This power consumption relates with the induced self-heating in the detector (12) (only during $t_{on}$) and the logic circuit (13). The power consumed during processing typically depends on the processing algorithm implemented. This level can be higher or lower than the level during the detection. The same applies for the buffering time. However, this processing and buffering time $\delta t_{buff}$ is typically significantly shorter than the detection time $t_{on}$—indicated in taupe shading in FIG. 5—or the residual time $t_{off}-\delta t_{buff}$. Consequentially, their combined integral both in terms of power consumption as well as in terms of induced self-heating is marginal compared to the integral of corresponding to the detection duration. A schematic depiction of the emitted power corresponding to the mentioned first two embodiments is given in FIG. 6.

The level of power consumption during the detection duration itself depends strongly on the activity rate during this duration. This activity rate depends on the amount of light present in the sensed environment (20) and the thermally induced dark carriers (DCR). The DCR increases with the activity rate: higher activity rate leads to a higher power consumption of the detector (12) in order to handle this activity rate, which means more power has to be dissipated in the form of heat, which increases DCR.

The detected light has two contributions. On the one hand, there is the light the system emits during $t_{on}$. This contribution we refer to as signal. On the other hand, there is the light independently present in the environment. This light could originate, for example, from the sun, or other light sources, such as other lasers. This contribution, together with DCR, we refer to as background.

In a remote sensing application one typically wants to maximize the ratio between signal and background. Increasing the signal would mean to emit more light. However, since we consider to already emit an eye-safety limited amount of power, we cannot further increase the signal. Nonetheless, by reducing the laser on-time from $t_p$ to $\tau_p^{(crit)}$ the aforementioned embodiments are able to maximize the emitted signal density. On the other side, while by simultaneously reducing the sensing time from $t_p$ to the matching $\tau_p^{(crit)}$ the background density does not change—it is outside of our control—its integrated contribution reduces. Namely, this reduction corresponds to the duty-cycle of the emission and detection on-time compared to their off-time, which is given by η. By means of this mechanism the aforementioned embodiments achieve the highest signal to background ratio (SBR) possible independent of the background level.

It should be noted that the idea to reduce the background contributions was already discussed in Kalshoven et al. U.S. Pat. No. 6,744,470. They tried to capture a video of a scene with increased shutter speed, which leads to a reduction in detected background contributions. They, however, didn't try to find an optimum between increasing the shutter speed further (thus reducing $t_{on}$ of the detector (12)) and simultaneously increase the signal contributions (the power of the emission during $t_{on}$). Such an optimum does indeed exist as demonstrated by the above embodiments. Furthermore, by reducing the activity rate as stated, the DCR can be reduced considerably, independent of the thermal management implemented. In particular, the disclosed method can be implemented without the need for DCR suppression elements as, for example, disclosed by Boisvert et al. US20150340390.

It should be also noted that the achievable compression factor $\eta^{-1}$ increases (and hence the duty-cycle η reduces) the shorter the target time unit integration time $t_p$ is. This means, sensing applications which can afford to work with short integration times, tend to particularly benefit from the disclosed embodiments, compared to sensing applications needing long integration times. For example, as indicated in FIG. 4 for α=100 mrad it is $\tau_p^{(crit)}(t_p=100\ ms)=10\ ms$ (compression factor of 10), while (not indicated in the figure) $\tau_p^{(crit)}(t_p=50\ ms)=0.625\ ms$ (compression factor of 80). Again, we do not emit more light with shorter time units. In fact, given these two examples during the shorter time unit $t_p=50$ ms we emit only half of the $t_p=100$ ms emission. Only after 2 compressed pulses of $\tau_p^{(crit)}=0.625$ ms each we have emitted the same power as after one pulse of $\tau_p^{(crit)}=10$ ms or $t_p=100$ ms, respectively. We also cannot gain any time: said 2 pulses we can emit only with a spacing of 50 ms; so that we emit the same power within 100 ms, on average. If we were to emit at a higher repetition rate, the average power would be higher than what the average power criterion allows.

Figure 8:
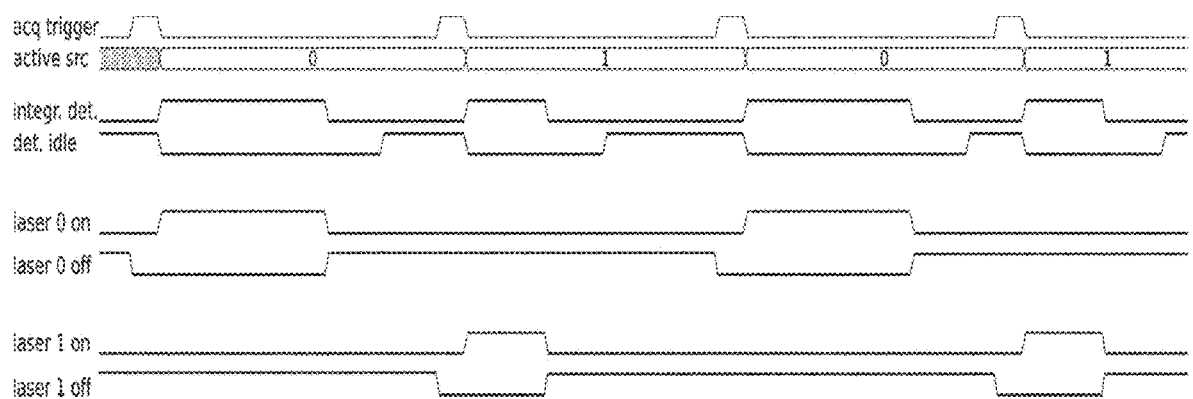
FIG. 8 shows a timing diagram corresponding to one of the disclosed embodiments, highlighted for two sources.

However, with a compressed emission of, for example, $\tau_p^{(crit)}(t_p=100\ ms)=10$ ms the detector is allowed to use 90% of the time (corresponding to $t_{off}$) to, for example, read out the measurement result, change settings, etc. If the read out doesn't need so much time, a new measurement acquisition can be started using a second, independent emitter, during $t_{off}$ of the first emitter. This allows the number of measurements per time to increase linearly with the number of independent emitters. A timing diagram corresponding to this concept is illustrated in FIG. 8, for an example with two independent emitters. The maximum number of independent emitters and as such the maximum increase in number of acquisitions is given by $\eta^{-1}$; or its closest lower bound integer value, respectively. In the above example for emitters with α=100 mrad and $t_p=100$ ms this would be limited by a theoretical maximum increase in number of acquisitions of $\eta^{-1}=10$. In this example emitter 0 would be active, for example, during 0 ms to 10 ms, after which emitter 1 would be active from 10 ms until 20 ms, etc. Subsequently, the off-time of emitter 0 would thus be from 10 ms to 100 ms, after which it once again could be active until 110 ms, etc. for example.

In such an extreme example the detector would be active 100% of the time. This high duty-cycle may seem contradictory to some of the goals stated for the embodiments mentioned above. Namely, a 100% duty-cycle detector would once again accumulate the whole background contributions and the power consumption on detector side wouldn't decrease. However, this is not correct: these background contributions are distributed over several acquisitions—10 in the current example. The single acquisitions still benefit from reduced background as stated above. The signal to background ratio (SBR) doesn't change as we increase the total amount of emitted signal along with the number of additional acquisitions. Likewise, the power consumption will increase in total, but not in terms of single acquisitions as we can acquire more measurements along with the higher power consumption.

In order for this increase in number of acquisitions per time not to violate the limits given by the eye-safety regulation it is important that the single emitters can be considered as independent. This means, the multi emitter arrangement has to be such that the resulting most restrictive position is at a point in space at which only one source irradiates the eye. In Hollander et al. EP1489398 they increase the brightness of their device by using multiple emitters. Each single one of their emitters emits several collimated beams in order to obtain a certain pattern. These beams are not intended to overlap (although some disclosed configurations of course keep open the possibility to do so). In their arrangement, the hazard to the eye is given by the power density present in one single beam of one of the emitters. As long as the emission of this beam is within the regulatory limit, the brightness of the overall device can be increased by mounting additional emitters. Active remote sensing applications often cannot work with a similar argument: the emission of the multiple emitters needs typically to overlap, and this overlap, typically, has to illuminate the whole field-of-view (FOV) of the detector.

Figure 9:
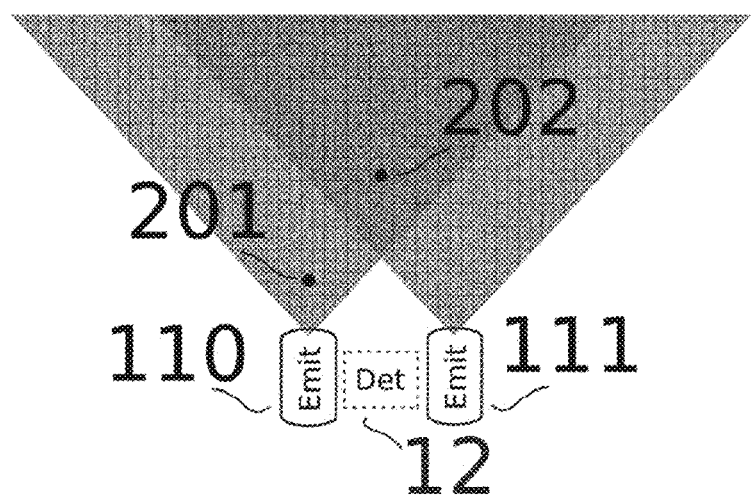
FIG. 9 is a schematic depiction of an analysis to find the most restrictive point in space concerning the eye-safety of a laser device with multiple emitters.

With reference to FIG. 9, in an arrangement of an active remote sensing application, we can consider an emitter (110) to be independent from another emitter (111) if the point in space (201) accessible to the emission of only one emitter is more restrictive than a point (202) accessible to the overlapping emission. For emitters emitting in the retinal hazard region, we can find this particular configuration by considering a particularity of the standard human eye: a regular human eye is able to produce a sharp image for objects at a distance of at least L=10 cm. Objects closer than this distance appear as blurry. A blurry image of an emitter on the retina represents a larger α, which increases correction factor $C_6$, thus resulting in a higher emission limit. On the other hand, for distances further away than the mentioned 10 cm, the smallest possible image of an emitter on the retina is a smaller α, thus smaller $C_6$, and thus lower emission limit. This is the reason why a large emitter α>$α_{min}$—when seen from close distance, but whose emission is collimated—has to be evaluated as a small source α=$α_{min}$, with the most restrictive position at the intersection of α→$α_{min}$. For divergent emitters the subtended angle α also decreases for further distance, but the amount of power that can enter the eye tends to decrease as well. Consequentially, for divergent emitters whose diameter of the emission at L=10 cm is larger than the 7 mm aperture provided by the eye, the most restrictive distance from the source, $L^{(restrict)}$, is at $L^{(restrict)}$=10 cm. For divergent emitters with a smaller divergence, the most restrictive distance from the emitter $L^{(restrict)}$ is at the distance at which the beam diameter corresponds to the 7 mm diameter of the eye.

Consequentially, given an arrangement of multiple emitters with identical divergence $\theta_{divergence}$ such that at $L^{(restrict)}$ only the emission of one emitter can reach the eye, the presence of the other emitters can be ignored. At farther distances than $L^{(restrict)}$ some of the light of additional emitters can enter the eye. However, at such farther distance the fraction of light of a primary emitter is also lower than its level at the most restrictive distance $L^{(restrict)}$. Furthermore, at such a farther distance these additional emitters would be within the field of view of the eye, so that the apparent size of this whole arrangement would have to be considered; which would lead to a larger value α. Of such an arrangement the individual emitters can be considered independent.

The resulting minimum distance x between such multiple emitters with identical divergence in such an arrangement is hence such that their angular distance β given at the critical distance of $L^{(restrict)}$ is larger than the divergence of the beam, $$\frac{\beta}{2} = \arctan\left(\frac{x/2}{L^{(restrict)}}\right) > \frac{\theta_{divergence}}{2}. \quad (Eq.\ 9)$$

For example, for an arrangement with emitters emitting at a divergence of 30° it is x≥5.4 cm.

For emitters emitting outside the retinal hazard region the argument concerning the size of the image of the emitter on the retina doesn't apply. Nonetheless, for 1400 nm≤λ<4000 nm the critical distance is still given by $L^{(restrict)}$=10 cm, such that the same spacing restrictions apply as for emitters in the retinal hazard region. For emitters emitting at λ≥4000 nm the regulation doesn't specify a critical distance and direct contact has to be assumed as the most hazardous condition. In this case the necessary spacing between the different emitters for them to count as independent emitters is directly given by the size of the regulated limiting measurement apertures. For example, for $10^5$ nm≤λ<$10^6$ nm this size, and thus minimum spacing, is 11 mm.

Therefore, in another embodiment of the present invention, and with reference to FIGS. 8 and 9, the emitter (11) consists of a plurality of independent emitters (110, 111, etc.) which are arranged around detector (12) with a spacing from each other according to (Eq. 9). In this embodiment the logic circuit (13) again sets a time unit as a target integration time $t_p$. It subsequently again translates said time unit integration time $t_p$ into a critical minimum time $\tau_p^{(crit)}$ and its corresponding critical power increase—respectively compression—factor $\eta^{-1}$. The logic circuit (13) induces the laser emission of a first emitter (110) whose power output is adjusted according to $\eta^{-1}$. Simultaneously, the logic circuit (13) also activates the detector (12). The laser emitter (110) and the detector (12) stay activated for the duration of $t_{on}=\tau_p^{(crit)}$, after which time the logic circuit (13) causes the two to deactivate. The logic circuit (13) then flags emitter (110) to be off for the subsequent duration of $t_{off}=t_p-\tau_p$. During this off-time the corresponding laser isn't allowed to emit light. In this embodiment, however, during this off-time the logic circuit (13) receives an acquisition trigger upon which the logic circuit induces the second emitter (111) to emit with a power output again adjusted according to $\eta^{-1}$. Simultaneously, the logic circuit (13) also activates the detector (12) again. Said acquisition trigger could originate from for example an external device, or the logic circuit itself could have a sub-unit which causes to issue such a trigger with a certain predetermined regularity. This acquisition trigger could also be coupled to the flags indicating that a certain emitter has to stay off; as soon as this flag resolves itself—i.e. after $t_{off}$ corresponding to a given emitter—an acquisition trigger could be issued. In the case an acquisition trigger arrives during a time during which all available emitters are flagged as off, the logic circuit (13) could either delay the acquisition trigger until a flag of one of the emitters is resolved, or it could ignore and skip the acquisition trigger. The laser emitter (111) and the detector (12) stay activated for the duration of $t_{on}=\tau_p^{(crit)}$, after which time the logic circuit (13) once again causes the two to deactivate. Subsequently, logic circuit (13) flags emitter (111) to be off for the duration $t_{off}$. This procedure is repeated for the other emitters of the plurality of independent emitters.

In this embodiment the logic circuit (13) could use the time between deactivating emitter (110) and detector (12), respectively, and activating and reactivating, respectively, emitter (111) and detector (12) in order to process the counters and buffer the results. Alternatively, the logic circuit (13) does not yet read out the counters and they're further incremented during the emission of emitter (111) and being processed after this second emission. As an example, we consider a system using 4 emitters (110, 111, 112, 113) each of apparent size α=100 mrad and using a time unit of $t_p$=100 ms, thus $\tau_p$=10 ms. The on-time of emitter (110) could be from 0 ms to 10 ms, the on-time of emitter (111) could be from 25 ms to 35 ms, the on-time of emitter (112) could be from 50 ms to 60 ms, and the on-time of emitter (113) could be from 75 ms to 85 ms, so that emitter (110) could again be activated from 100 ms to 110 ms, and so on. In this example the individual acquisitions are equally spaced in time, resulting in, as an example, a four times higher number of measurements per time than given by a single $t_p$. Alternatively, the on-time of emitter (110) could be again from 0 ms to 10 ms, the on-time of emitter (111) could be from 10 ms to 20 ms, the on-time of emitter (112) could be from 20 ms to 30 ms, and the on-time of emitter (113) could be from 30 ms to 40 ms, so that emitter (110) could again be activated from 100 ms to 110 ms, and so on. In this example, the processing could happen after the four emissions after 40 ms, resulting in the same number of measurements per time as given by a single $t_p$ but with four times the amount of signal. Likewise, all four emitters could emit at the same time from 0 ms to 10 ms in case the purpose of the multiple emitters is not to increase the number of measurements one can acquire per time, but purely the amount of signal available.

In the previously mentioned embodiments it is possible that the system is turned off during $t_{off}$ corresponding to any of the emitters and back on, still during $t_{off}$. In this case it could be possible that the information about the residual $t_{off}$ is lost, so that the logic circuit (13) assumes the laser is allowed to emit anew. Therefore, in yet another embodiment the logic circuit (13) utilizes an additional instruction set which results in an initial off-time $t_{off}^{(init)}$ directly after, and only after, boot up. During this initial off-time all emitters are flagged to be off. This initial off-time could, for example, correspond to $t_p$, if the system works with only one constant $t_p$ setting. On the other hand, if $t_p$ can change then $t_{off}^{(init)}$ could correspond to the longest accessible $t_p$.

In the embodiments mentioned thus far we have not addressed the possibility to change the duration of the uncompressed time unit $t_p$ from one acquisition to the next. From an eye-safety point of view, the average power criterion implies that we have to average over varying averaging durations T. Respectively, more than varying durations we have to consider varying averaging windows [$t_0$, $t_0$+T]. In an emission with only identical pulses, varying the duration and/or the window doesn't change the result, $$P_{avg} = \frac{1}{T} \int_{t_0}^{t_0+T} P(t)dt.$$

The amount of photons that are allowed to be emitted within $t_p$ is limited by the average power criterion. In the aforementioned embodiments we compress these photons into a pulse of duration $\tau_p$. After emitting this pulse we have to wait the remaining $t_{off}=t_p-\tau_p$ before we're again allowed to emit. A shorter time unit $t_{p0}$ can be compressed by a larger amount—i.e. result in a higher peak power—than a longer time unit $t_{p1}$ with $t_{p0}<t_{p1}$. If a low peak power long time unit is followed by a high peak power short time unit, as we shift the averaging window by an infinitesimal amount δt from [$t_0$, $t_0$+T] to [$t_0$+δt, $t_0$+δt+T] the peak contribution of the second pulse during the shifted δt is higher than what gets out of the window of the low peak pulse. Therefore, if after $t_{off}$ we want to emit with a higher peak power than during the preceding $\tau_p$, we have to wait an extra amount of time. This extra amount of time is such that the additional power (/energy) added during an infinitesimal shift in time δt is not more than the budget that is freed up as we leave δt of the preceding time unit.

In other words we look for time $t_{delay,m+1}$ at which the energy of the preceding time unit integration time $t_{pm}$ matches the energy of the subsequent one. During the time $\tau_{pm+1}$ the integrated power of the subsequent high peak power pulse during δt is larger than the integrated power of the preceding pulse during the same shift δt. Respectively, given a low peak power long duration pulse followed by a high peak power short duration pulse, $t_{delay,m+1}$ corresponds to only the time during which the first low peak power pulse emits the energy corresponding to the excess given by the high peak power of the second pulse. It is therefore, $$Q_{t_{pm+1}} = \int_0^{\tau_{pm+1}+t_{delay_{m+1}}} P_{t_{pm}} dt = P_{t_{pm}}(\tau_{pm+1}+t_{delay_{m+1}})$$

$$\Rightarrow t_{delay_{m+1}} = \frac{Q_{t_{pm+1}}}{P_{t_{pm}}} - \tau_{pm+1} =$$

$$\frac{P_{t_{pm+1}}\tau_{pm+1}}{P_{t_{pm}}} - \tau_{pm+1} = \frac{P_0\eta_{m+1}^{-1}\tau_{pm+1}}{P_0\eta_m^{-1}} - \tau_{pm+1} = (\eta_m - \eta_{m+1})t_{pm+}$$

With $P_0$ we denoted the baseline power corresponding to the targeted average power which is adjusted by $\eta^{-1}$ to obtain higher peak power pulses. Again, this calculation only makes sense under the assumption $t_{pm}>t_{pm+1}$, with $Qt_{pm}>Qt_{pm+1}$ and $Pt_{pm}<Pt_{pm+1}$ (and hence $\eta_m>\eta_{m+1}$), otherwise we would have to integrate over more than one pulse to equal $Qt_{pm+1}$; or $t_{delay,m+1}$ would end up negative, respectively.

Correspondingly, another embodiment of the present invention again consists of a plurality of independent emitters. For each of these emitters the logic circuit (13) first sets, as in the previous embodiments, a target time unit integration time $t_{pm+1}$. The logic circuit (13) subsequently translates this $t_{pm+1}$ into a critically compressed pulse duration $\tau_{pm+1}$, along with its corresponding critical power increase factor $\eta_{m+1}^{-1}$, and a necessary delay $t_{delay,m+1}=\max[(\eta_m-\eta_{m+1})t_{p,m+1}, 0]$ by considering the previously used integration time $t_{pm}$ or $\eta_m$, respectively. In order to calculate the very first $t_{delay,1}$ for the correspondingly first on-time after boot up, the logic circuit (13) uses the largest accessible value for $t_{p0}$ or smallest $\eta_0$, respectively.

For the MIR and FIR spectral regions the above disclosed embodiments apply correspondingly, i.e. there is only one time domain to consider (between $T_i$ and $T_3$) and there are no correction factors $C_x$ to keep track of. However, one particularity of the present invention regarding this spectral region is worth mentioning explicitly. The region 1500 nm<λ<1800 nm allows the peak power of a single pulse to be one order of magnitude higher than in the region 1400 nm<λ≤1500 nm and 1800 nm≤λ≤2600 nm. For this reason the region 1500 nm<λ<1800 nm is often referred to as the "eye-safe" region, and is, for example, exploited as such in Mayor et al. U.S. Pat. No. 7,583,364. However, since $T_i$ is very long for this region, the summed amount of energy emitted in multiple pulses within $T_i$ has to be below the regulated limit. Given the present invention, on the other hand, and in particular the pulse compression highlighted in FIG. 3, the spectral regions 1400<λ≤1500 nm and 1800 nm≤λ≤2600 nm become more attractive for remote sensing applications. This spectral region is further interesting as the atmospheric absorption is particularly pronounced in this region: the background contributions originating from the sun are significantly lower than within the "eye-safe" region. This fact helps to reduce the activity rate on detection side to a minimum, which again positively affects the power consumption and self-heating on detection side.

The embodiments of the present disclosure are not required to operate with class 1 lasers. The disclosed methods in order to compress the emission of a certain time unit $t_p$ into a shorter $\tau_p$ is also beneficial if the baseline of the to be compressed power is higher than the allowed emission level corresponding to class 1 lasers. The disclosed method to optimize the emitted signal density—and thus the detected signal to background ratio—is generally valid as eye-safety concerns are involved. As a person skilled in the art will know, a class 1 laser is not necessarily safe, nor is a safe laser necessarily class 1. Namely, higher class lasers typically have nominal ocular hazard distance (NOHD). For distances within this NOHD the induced exposure is above the maximally permitted exposure (MPE) for eye-safe operation. Outside this NOHD radius, on the other hand, the laser can be considered safe. The MPE values scale in accordance with the AEL values discussed in the present disclosure. In some situations such a high class laser is operated in a way that the device itself is inaccessible for humans. This could be for example a divergent laser mounted on a lamp post, or on a high wall, or on the ceiling of a factory, whereas the power density at the ground would be below the MPE. According to the cited laser safety regulations a laser device can be assigned only one laser class, irrespective of its use. In the stated situations a chosen acceptable NOHD defines the acceptable emission power budget. If this power budget is emitted in short pulses shorter than τ p(crit) according to the present invention, the NOHD would increase, thus potentially leading to an unsafe operation. On the other hand, by maximizing the signal density of said given emission power budget with the methods disclosed in the above embodiments the NOHD of such high class laser devices would not move, while the SBR would improve as mentioned. Consequentially, the present invention is also attractive for such high class laser devices.

In order to explain some of the embodiments corresponding to the present invention we have stated values taken for the cited eye-safety regulation; such as the limits given by $\alpha=5$ mrad for extended sources in the retinal hazard region, or $T_3$, or the spectral regions delimited by e.g. 1400 nm$<\lambda \leq$1500 nm, etc. It is possible that future editions of the cited eye-safety regulation changes the numerical values of these size, time, and/or wavelength breakpoints. The explanations given in the present disclosure should enable a person skilled in the art to adapt the stated limits, which is still within the spirit of the present invention.

It will be understood by those skilled in the art that the present invention is not limited to the embodiments illustrated above and that many modifications and additions may be made without departing from the scope of the invention as defined in the appending claims.

The invention claimed is:

1. A method for remote sensing by means of a plurality of $n_{src}>1$ independent diverging laser emitters comprising the steps of:
   providing a laser source comprising an array of single laser sources having each a laser class and a nominal ocular hazard distance (NOHD);
   setting a target time unit integration time $t_p$;
   translating said time unit integration time into a reduced time $\tau_p$ and its corresponding power increase factor $\eta^{-1}$ so that the energy of the resulting pulse of duration $\tau_p=\eta*t_p$ remains below the acceptable eye-safety emission power of said laser at said NOHD without increasing the NOHD;
   repeating for every emitter k of said plurality of $n_{src}$ emitters the steps of:
      waiting for a given offset duration $t_{offset,k}$;
      activating both the laser emitter k, with a power output corrected by $\eta^{-1}$, and the detector for a duration of $\tau_p$;
      deactivating said emitter k and detector after duration $\tau_p$;
      flagging emitter k to be kept off for the subsequent duration $t_{off}=t_p-\tau_p$;
   wherein the independence of the plurality of emitters is given by their geometrical arrangement around the detector such that their minimum distance from each other is at least $x=2\ L^{(restrict)} \tan(\theta_{divergence}/2)$, $L^{(restrict)}$ being the most restrictive distance from said emitters and $\theta_{divergence}$ being the divergence of said emitters.

2. A method for remote sensing by means of a plurality of $n_{src}>1$ independent emitters and at least one detector, comprising:
   setting a target time unit integration time $t_p$;
   translating said time unit integration time into a reduced time $\tau_p$ and its corresponding power increase factor $\eta^{-1}$;
   repeating for every emitter k of said plurality of $n_{src}$ emitters the steps of:
      waiting for a given offset duration $t_{offset,k}$;
      activating both the laser emitter k, with a power output corrected by $\eta^{-1}$, and the detector for a duration of $\tau_p$;
      deactivating said emitter k and detector after duration $\tau_p$;
      flagging emitter k to be kept off for the subsequent duration $t_{off}=t_p-\tau p$;
   wherein the method delays the activation of at least one of the laser emitters and the photo-sensitive detector by an additional amount of $t_{delay}=\max[(\eta_{preceding}-1)t_p,\ 0]$, with $\eta_{preceding}$ being the inverse of the power increase factor of a preceding acquisition.

3. A method according to claim 2 in which said target integration time unit $t_p$ results from a target frame rate.

4. A method according to claim 2 wherein during the off-time $t_{off}=t_p-\tau_p$ communication is exchanged with an external device (14).

5. A method according to claim 4 wherein said communication updates configurations.

6. A method according to claim 2 wherein the independence of the plurality of emitters is given by their geometrical arrangement around the detector such that their minimum distance from each other is at least $x=2\ L^{(restrict)} \tan(\theta_{divergence}/2)$, $L^{(restrict)}$ being the most restrictive distance from said emitters and $\theta_{divergence}$ being the divergence of said emitters.

7. A method according to claim 2 wherein the translation of said time unit integration time $t_p$ into a reduced time $\tau_p$ is obtained by means of a look-up-table (LUT) listing pre-calculated values.

8. A method according to claim 2 wherein the translation of said time unit integration time $t_p$ into a reduced time $\tau_p$ is obtained by calculating it continuously according to the time domain and/or the spectral region.

9. A method according to claim 2 wherein the translation of said time unit integration time into a reduced time $\tau_p$ is obtained by providing coarse steps from a look-up-table (LUT) listing pre-calculated values and by calculating interpolated value.

10. A method according to claim 2 wherein it operates in a continuous acquisition mode set up to acquire frames of $t_p$ integration time each in order to obtain a frame rate $1/t_p$.

11. A method according to claim 2 wherein it operates in such a way that it acquires a single acquisition following a trigger signal and then waits for a subsequent trigger signal.

12. A method according to claim 11 wherein, if the trigger signal arrives during the idle mode duration $t_{off}$, said trigger signal is ignored or delayed until said duration has timed out.

13. A device for remote sensing by means of a plurality of $n_{src} \geq 1$ independent emitters and at least one detector, comprising $n_{src}$ laser emitters, a photo-sensitive detector and a logic circuit controlling the $n_{src}$ laser emitters and the photo-sensitive detector and a computer program product embodied in one or more computer readable medium(s) having computer readable program code embodied thereon executable by a processor to perform actions comprising:
   setting a target time unit integration time $t_p$;
   translating said time unit integration time into a reduced time $\tau_p$ and its corresponding power increase factor $\eta^{-1}$;
   repeating for every emitter k of said plurality of $n_{src}$ emitters the steps of:
      waiting for a given offset duration $t_{offset,k}$;
      activating both the laser emitter k, with a power output corrected by $\eta^{-1}$, and the detector for a duration of $\tau_p$;
      deactivating said emitter k and detector after duration $\tau_p$;
      flagging emitter k to be kept off for the subsequent duration $t_{off}=t_p-\tau_p$;

wherein the device comprises means for delaying the activation of at least one of the laser emitters and the photo-sensitive detector by an additional amount of $t_{delay}=\max[(\eta_{preceding}-\eta)t_p, 0]$, with $\eta_{preceding}$ being the inverse of the power increase factor of a preceding acquisition.

14. A device according to claim 13 wherein said target integration time unit results from a target frame rate.

15. A device according to claim 13 wherein during the off-time $t_{off}=t_p-\tau_p$ communication is exchanged with an external device (14).

16. A device according to claim 15 wherein said communication updates configurations.

17. A device according to claim 13 wherein the $n_{src}$ emitters are arranged around the photo-sensitive detector such that their minimum distance from each other is at least $x=2 L^{(restrict)} \tan(\theta_{divergence}/2)$, $L^{(restrict)}$ being the most restrictive distance from said emitters and $\theta_{divergence}$ being the divergence of said emitters.

18. A device according to claim 13 wherein the translation of said time unit integration time $t_p$ into a reduced time $\tau_p$ is obtained by means of a look-up-table (LUT) listing pre-calculated values.

19. A device according to claim 13 wherein the translation of said time unit integration time $t_p$ into a reduced time $\tau_p$ is obtained by calculating it continuously according to the time domain and/or the spectral region.

20. A device according to claim 13 wherein the translation of said time unit integration time $t_p$ into a reduced time $\tau_p$ is obtained by providing coarse steps from a look-up-table (LUT) listing pre-calculated values and by calculating interpolated value.

21. A device according to claim 13 wherein it operates in a continuous acquisition mode set up to acquire frames of $t_p$ integration time each in order to obtain a frame rate $1/t_p$.

22. A device according to claim 13 wherein it operates in such a way that it acquires a single acquisition following a trigger signal and then waits for a subsequent trigger signal.

23. A device according to claim 22 wherein, if the trigger signal arrives during the idle mode duration $t_{off}$, said trigger signal is ignored or delayed until said duration has timed out.

24. A device according to claim 22 wherein it further comprises an external device sending said trigger signal.

25. A device according to claim 24 wherein said external device is a screen, a projector, a computer, or a server.

26. A method for remote sensing by means of a plurality of $n_{src}>1$ independent diverging laser emitters comprising the steps of:

providing a laser source comprising an array of single laser sources having each a laser class and a nominal ocular hazard distance (NOHD);

setting a target time unit integration time $t_p$;

translating said time unit integration time into a reduced time $\tau_p$ and its corresponding power increase factor $\eta^{-1}$ so that the energy of the resulting pulse of duration $\tau_p=\eta*t_p$ remains below the acceptable eye-safety emission power of said laser at said NOHD without increasing the NOHD;

repeating for every emitter k of said plurality of $n_{src}$ emitters the steps of:

waiting for a given offset duration $t_{offset\ k}$;

activating both the laser emitter k, with a power output corrected by $\eta^{-1}$, and the detector for a duration of $\tau_p$;

deactivating said emitter k and detector after duration $\tau_p$;

flagging emitter k to be kept off for the subsequent duration $t_{off}=t_p-\tau p$;

configured so that at least two emitted light beams overlap at least partially and at least one detector having a field of view that is the same as the total subtended angle of the overlap of said emitted light beams.

* * * * *